United States Patent [19]
Kaffrell

[11] Patent Number: 5,234,741
[45] Date of Patent: Aug. 10, 1993

[54] HEAVY-DUTY PACKING OF CORRUGATED GLASS PLATES FOR COLUMNS

[75] Inventor: Walburga Kaffrell, Mainz, Fed. Rep. of Germany

[73] Assignee: Schott Glaswerke, Mainz, Fed. Rep. of Germany

[21] Appl. No.: 498,575

[22] Filed: Mar. 26, 1990

[30] Foreign Application Priority Data

Mar. 25, 1989 [DE] Fed. Rep. of Germany ....... 3909995

[51] Int. Cl.⁵ .......................... B32B 3/28; B01D 47/00
[52] U.S. Cl. ..................................... 428/184; 428/179; 428/182; 428/185; 261/112.2; 55/241; 202/267.2; 52/796; 52/798; 156/210; 156/211; 156/250; 156/510
[58] Field of Search ............... 428/179, 182, 184, 116, 428/185, 188; 261/112.2, DIG. 72; 156/210; 165/166; 55/241; 201/41; 202/267.2; 203/86; 52/798, 796

[56] References Cited

U.S. PATENT DOCUMENTS 3,947,532  3/1976  Skold et al. ...................... 261/112

4,255,171  3/1981  Dravnieks ........................... 428/182

FOREIGN PATENT DOCUMENTS

| 1300511 | 8/1969 | Fed. Rep. of Germany . |
| 2327373 | 12/1974 | Fed. Rep. of Germany . |
| 3909995 | 8/1990 | Fed. Rep. of Germany . |
| 1143052 | 9/1957 | France . |
| 2230397 | 12/1974 | France . |
| 943145 | 11/1963 | United Kingdom . |
| 1451786 | 10/1976 | United Kingdom . |
| 1471442 | 4/1977 | United Kingdom . |
| 1580566 | 12/1980 | United Kingdom . |
| 2229377 | 9/1990 | United Kingdom . |

Primary Examiner—Donald J. Loney
Attorney, Agent, or Firm—Millen, White, Zelano & Branigan

[57] ABSTRACT

The disclosure relates to a packing for a column in the shape of a cylindrical stack of corrugated plates of glass wherein the corrugated plates are held together either by a strap tightened around the stack or by being bonded together at the points of intersection of the corrugated plates.

14 Claims, 1 Drawing Sheet

HEAVY-DUTY PACKING OF CORRUGATED GLASS PLATES FOR COLUMNS

BACKGROUND OF THE INVENTION

The invention relates to a heavy-duty packing for columns in the shape of a cylindrical stack of corrugated plates placed against one another in an alternatingly, oppositely oriented fashion.

In thermal separating techniques, regular-structure shaped packings are utilized in addition to simple bulk packings. The elements of the packing consist of obliquely corrugated plates placed in contact with one another in alternatingly oppositely oriented fashion so that open intersecting channels are formed which extend obliquely with respect to the axis of the column. As a result, a substantial improvement is obtained in contact between liquid and vapor phases, and thus in the degree of efficiency of the packing as compared with that of a bulk packing. By offsetting the individual packing parcels with respect to each other by in each case 90°, a further intermixing of the phases is achieved.

The packing elements consist of various materials, such as ceramic, stainless steel or other metallic materials, as well as of synthetic resins. The individual corrugated plates are joined together by sintering in case of a ceramic and by spot welding in case of steel. German Patent 1,300,511, Jul. 1, 1964 and 2,327,373, May 29, 1973, illustrate configurations of packing plates.

There has been the desire for a long time to manufacture high-performance packings from glass, a corrosion resistant material. This need, however, could not be fulfilled heretofore because the known bonding techniques, namely sintering or welding, cannot be utilized to bond glass.

SUMMARY OF THE INVENTION

In view of the aforementioned considerations, it is an object of the invention to configure a packing parcel of corrugated glass plates.

According to one embodiment, corrugated glass plates are placed in contact with one another, alternatingly in opposite orientation so that they form a cylindrical pack surrounded by at least one strap.

Suitable straps are synthetic resin bonds and films, e.g., shrink films or shrunk-on tubular films which are laid around the pack and shrunk-fit under the effect of heat. Alternatively, more solid bands, such as known plastic pipe clamps, may be utilized. These can be made, for example, of a serrated synthetic resin strip provided at one end with a plastic eye with a locking means. The other end of the strip is passed through the eye, with the serration in cooperation with the latch means permitting only pulling of the strap in the closing direction, but no movement in an expansion direction of the strap. Suitable materials for the strap are synthetic resins which are rugged and inert under the operating conditions of the column. Polytetrafluoroethylene and its copolymers are the preferred materials for especially corrosion-resistant straps.

Straps of glass fibers or glass cloth, as well as glass fiber cables or strings of glass fibers are likewise especially preferred. Straps of glass fibers have the advantage of good corrosion resistance similar to that of the packing material proper. Straps of glass fiber or glass cloth have the advantage that they are very flat, i.e., enlarge the diameter of the packing only to an insubstantial extent; with the use of cables or strings, these can serve for fitting the packing tightly into the column because they have a certain compressibility or elasticity in the radial direction, the cable or string serving as a ring seal toward the inner wall of the column. The ends of the cables or strings can be joined by slicing or knitting, depending on their thickness.

In dependence on the size of the packing and the strength of the strap, one or several straps can be provided.

According to another embodiment of the invention, the corrugated glass plates are joined in the way described above wherein they are connected at least at a portion of the points of intersection of the corrugations of two adjacent corrugated plates by means of a suitable adhesive in such a way that they finally likewise result in a cylindrical stack.

Suitable adhesives can be all feasible synthetic resin adhesives stable under the operating conditions of the column. As in the case of the use of straps, a person skilled in the art selects the suitable adhesives based on the operating conditions known to him. However, adhesives having an inorganic chemical basis, e.g., adhesives based on sodium silicate or specially soldering glasses are particularly suitable because of their high corrosion resistance which is similar to that of the packing material. Soldering glasses are especially low-melting glasses and are placed in ground form as a paste between the parts to be joined and are made to melt by heating, whereby a glass bond is established between the glass plates to be joined. Soldering glasses are commercially available for other purposes in a great variety of compositions and expansion coefficients so that it is readily possible to find glass solders suitable with respect to their strength and fitting to the glass of the packing.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
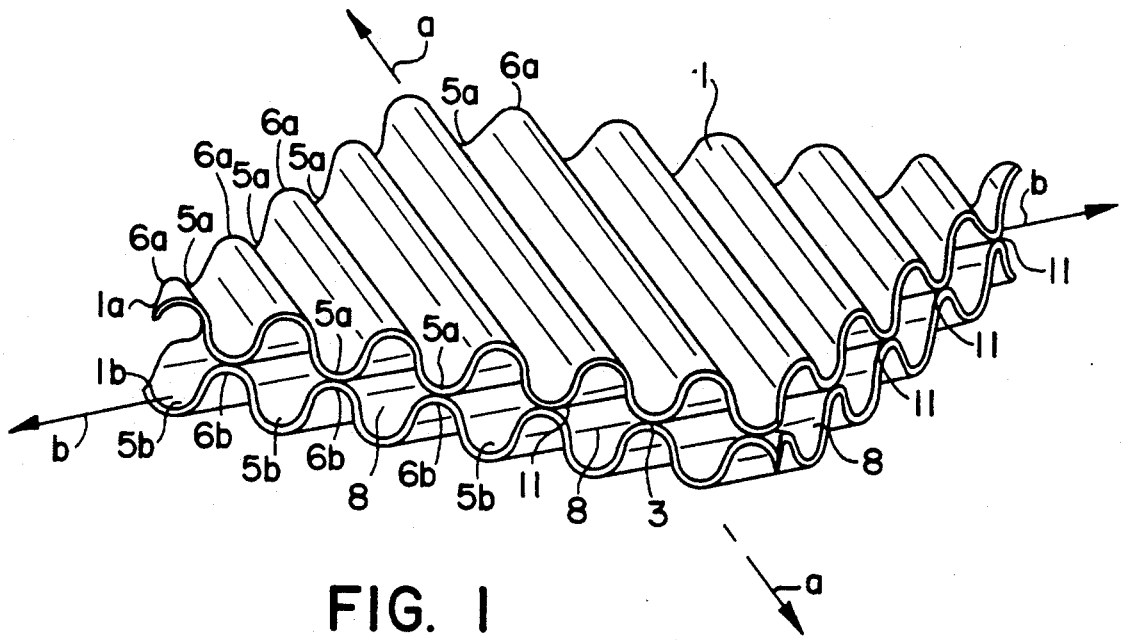
FIG. 1 shows two superimposed corrugated glass plates bonded together in accordance with this invention.

As can be seen from FIG. 1, the corrugated plates 1 are composed in opposite orientation in an alternating pattern in the heavy-duty packings of the type here under consideration. According to the invention, these corrugated plates are made of glass and are bonded together at least at a portion of the points of intersection 3 of the corrugation apices.

Figure 2:
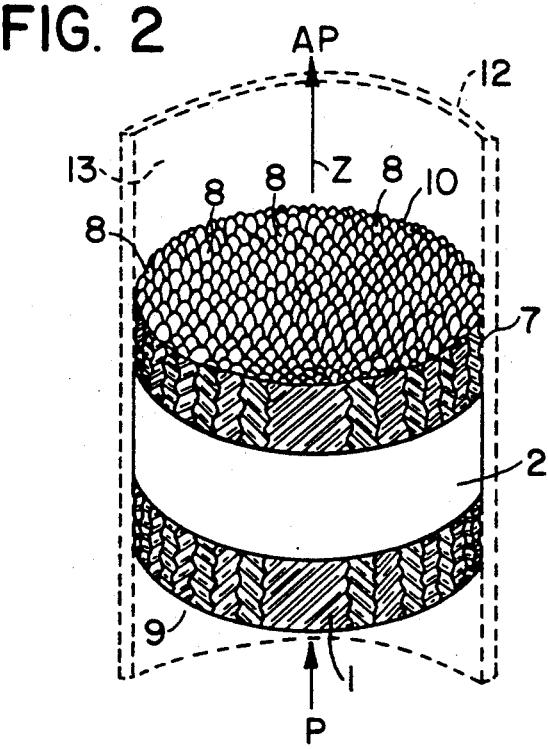
FIG. 2 shows a heavy-duty packing with a strap according to this invention with the corrugated plates oriented vertically.

As is shown in FIG. 2, the cylindrical packing stack, composed of corrugated glass plates 1 of appropriate size, is held together by a strap 2 which has been placed in the form of a section of tubular shrink film over the stack and shrink-fitted by heating.

The packing stack can be transported as a compact pack and inserted in a column, such as a thermal column, thus filling out the column cross-section in uniform fashion.

Considering the invention in more detail, the corrugated plates 1a and 1b of FIG. 1 each have furrows and ridges 5a, 5b and 6a, 6b, respectively. The furrows and ridges of plate 1a extend in direction "a" while the furrows and ridges of plate 1b extend in direction "b". As is seen in FIG. 2, a multiplicity of corrugated plates 1 are stacked together to form a packing 7 for columns. The spaces 8 between the corrugated plates 1 provide obliquely extending channels for the migration of liquid and vapor phases of fluids through the packing 7 enhancing contact and intermixing of liquid and vapor phases in the packing.

As can be seen in FIG. 1, the furrows 5a of plate 1a abutt the ridges 6b of the plate 1b to configure the spaces 8 with opposed undulating walls promoting turbulence and mixing of the fluid as the fluid transverses the spaces 8. As is seen in FIG. 2, there is a pressure differential $\Delta P$ between the lower and upper surfaces 9 and 10 of the packing 7 so that the fluids flow or migrate from one end face through the other in directions oblique with respect to the axis Z of the packing 7 depending, for example, on their density. Depending on the application, fluids may flow or migrate in opposite directions through the packing with, for example, vapor rising and liquid falling.

The ridges 6b and furrows 5a abutt in point or short line contact depending on whether the apices are abrupt or flat and in accordance with one embodiment of the invention are bonded to one another by soldering glass 11. Since soldering glass has a melting point substantially less than that of the corrugated glass plates 1, the corrugated plates are bonded to one another by coating at least the apices of the abutting grooves and furrows with soldering glass paste, retaining the apices in abutment by clamping and heating the assembly to fuse the glass solder to itself and to the apices. The preferred glass solders are those having an inorganic chemical composition.

In accordance with another embodiment of the invention, inorganic adhesives such as those utilizing sodium silicate base may also be utilized.

In accordance with an alternative approach, the plates 1 are held in abutment with one another mechanically with straps or bands such as strap or band 2 which can be of a heat shrinkable film material or alternatively a heat shrinkably fitted tube. Corrosion resistant straps having various locking configurations may also be used. Polytetrafluoroethylene and its copolymers are the preferred materials for the straps.

When the packing is inserted into a column 12, shown in dotted lines and in section with a portion removed, the peripheral strapping 2 serves as a seal between the packing and the inner surface 13 of the column wall.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, if any, cited above and below, and of corresponding application Federal Republic of Germany P 39 09 995.4, filed Mar. 25, 1989, are hereby incorporated by reference.

EXAMPLE

For a distillation column 12 having an internal diameter of about 300 mm, the plates 1 have a length of 170 mm and are of various widths with plates adjacent the periphery having widths substantially less than the plates adjacent the diameter. The height of each undulation is preferably in the range of 10 to 15 mm and the thickness of each plate is minimal, in the range of about 0.8 to 2 mm and preferably about 1.2 mm. The glass of which the plates are made is preferably a corrosion resistant glass such as SCHOTT glass No. 8326 ($\alpha=6.6$ and Tg=560° C.). The glass solder is a commercially available composite glass solder having a soldering temperature of about 425° C. and soldering time of about 15 minutes. Exemplary of such a glass solder is glass solder No. G 017-393 ($\alpha=6.5$, Tg=320° C.).

The preferred procedure for manufacturing the stack or packing 7 for smaller column diameters of about 300 mm or less, is to adhere the plates 1 to one another with glass solder or sodium silicate adhesive to form a rectangular block. The rectangular block is then cut into a cylinder with a saw.

In order to form a packing held together with a belt or strap, plates 1 of different widths are assembled in abutting relationship perhaps within a cylindrical template. The cylindrical stack is then surrounded by the selected strapping device.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Heavy-duty packing for columns in the shape of a cylindrical stack of corrugated unitary plates made of fluid impervious unitary glass sheets wherein the corrugated plates have furrows and ridges, wherein the ridges of each plate are in contact with the furrows of each adjacent plate, which adjacent plate is oriented to extend opposite the ridges, and wherein the corrugated plates (1) are held together by at least one strap (2).

2. Heavy-duty packing according to claim 1, wherein the strap (2) is comprised of a material selected from the group consisting of glass cloth and glass fiber cable.

3. Heavy-duty packing according to claim 1, wherein the strap (2) is comprised of a material selected from the group consisting of shrink film and stretched film.

4. Heavy-duty packing for columns in the shape of a cylindrical stack of unitary corrugated plates of fluid impervious unitary glass sheets wherein the corrugated plates have ridges and furrows, wherein the ridges of each plate are in contact with the furrows of each adjacent plate, which adjacent plate is oriented to extend opposite the ridges, the ridges and furrows in contact being adhered to one another by an adhesive bond.

5. Heavy-duty packing according to claim 4, wherein the adhesive bond is comprised of an inorganic adhesive selected from the group consisting of sodium silicate bases and glass solder.

6. Packing for use in tubes forming distillation columns comprising corrugated glass plates having corrugations of adjacent plates extending at an angle with respect to one another to define channels therebetween with undulating walls; means for holding the glass plates in abutment with one another in a cylindrical pack formed about a central axis and having opposed end faces with the corrugations oriented at an angle with respect to the central axis, wherein fluid traversing the pack migrates through the channels as the fluid advances from one end face through the other.

7. The packing of claim 6, wherein means for holding the glass plates in abutment with one another includes a glass solder adhesive on the corrugations.

8. The packing of claim 6, wherein the means for holding the glass plates in abutment with one another includes a sodium silicate adhesive.

9. The packing of claim 6, wherein the means for holding the glass plates in abutment includes a strap of glass material.

10. The packing of claim 6, wherein the means for holding the glass plates in abutment includes a strap of heat shrunk material.

11. The packing of claim 6, wherein the means for holding the glass plates in abutment includes strapping means surrounding the packing, the strapping means forming a seal with the wall of the tube forming the column.

12. In a method of mass transfer in a packed distillation column, transporting a fluid through a column having a packing therein comprising corrugated glass plates having corrugations of adjacent plates extending at an angle with respect to one another to define channels therebetween with undulating walls; means for holding the glass plates in abutment with one another in a cylindrical pack formed about a central axis and having opposed end faces with the corrugations oriented at an angle with respect to the central axis, wherein fluid traversing the pack migrates through the channels as the fluid advances from one end face through the other.

13. A method of fabricating packing for use in tubes forming distillation columns comprising forming an array of sheets of corrugated glass plates in a rectangular block with the corrugations extending obliquely with respect to one another to define channels therebetween by adhering the corrugations to one another with an adhesive and thereafter sawing the rectangular block into a cylindrical shape.

14. The method of claim 13, wherein the adhesive is solder glass paste disposed on the corrugations at points of contact thereof and wherein the method includes the steps of heating the stack to a temperature sufficient to melt the glass solder but not the corrugated glass plates and then cooling the stack to solidity the glass solder and bond the corrugated glass plates to one another.

* * * * *